Aug. 9, 1966 S. H. PERLMAN 3,265,861
FOOD HEATING OVEN
Filed Aug. 12, 1963 4 Sheets-Sheet 1
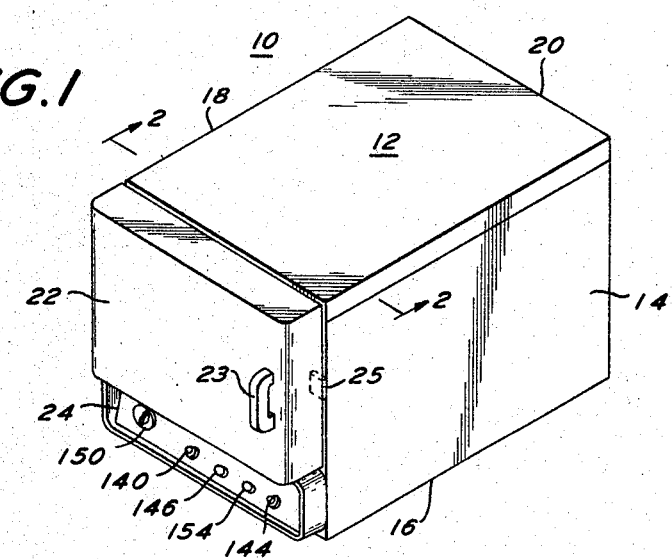
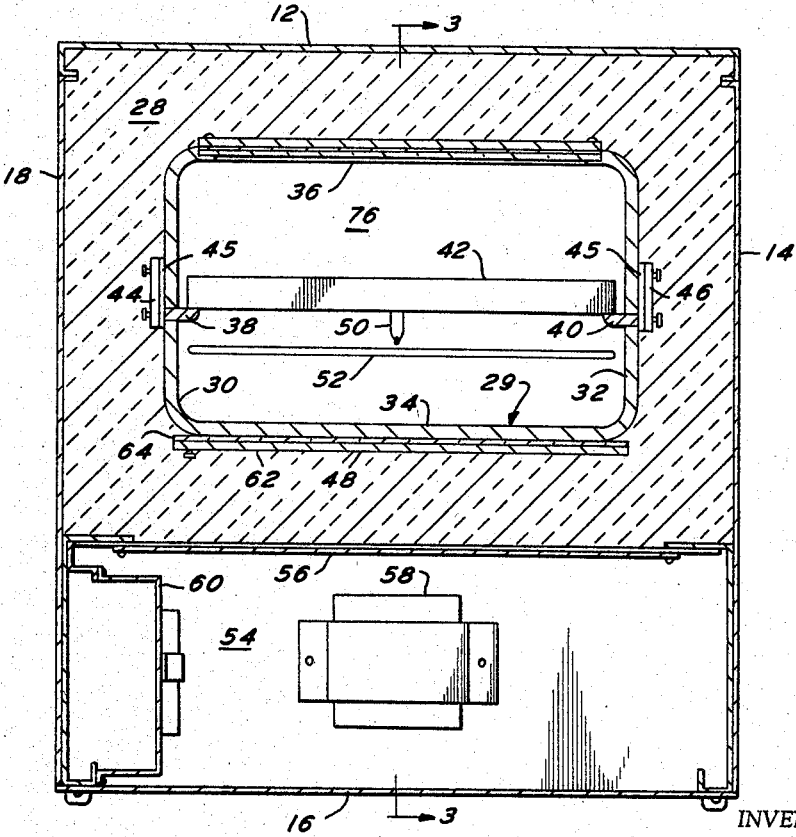
INVENTOR.
SIDNEY H. PERLMAN
BY Arthur H. Seidel
ATTORNEY

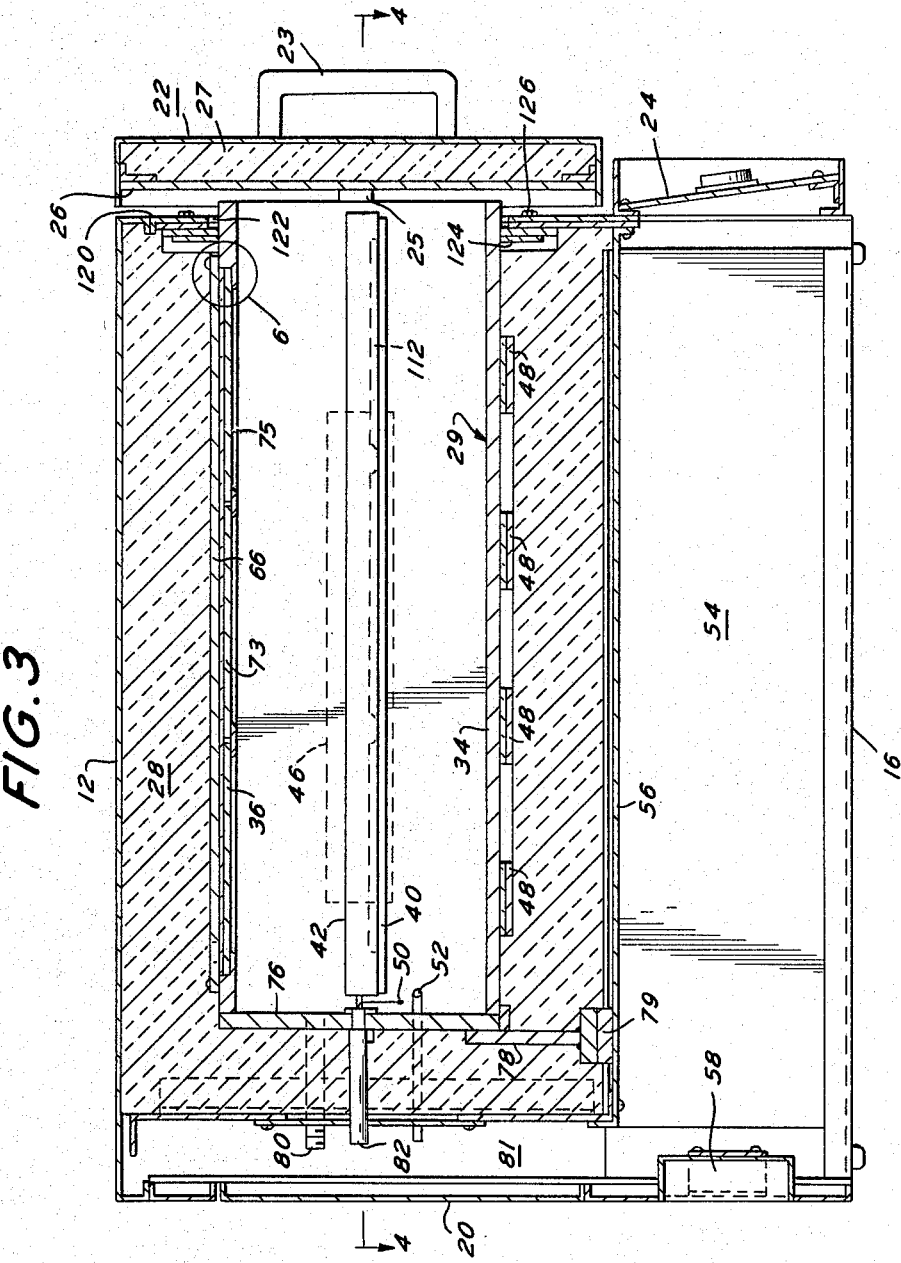

Aug. 9, 1966

S. H. PERLMAN 3,265,861

FOOD HEATING OVEN

Filed Aug. 12, 1963

INVENTOR.
SIDNEY H. PERLMAN

BY *Arthur H. Seidel*

ATTORNEY

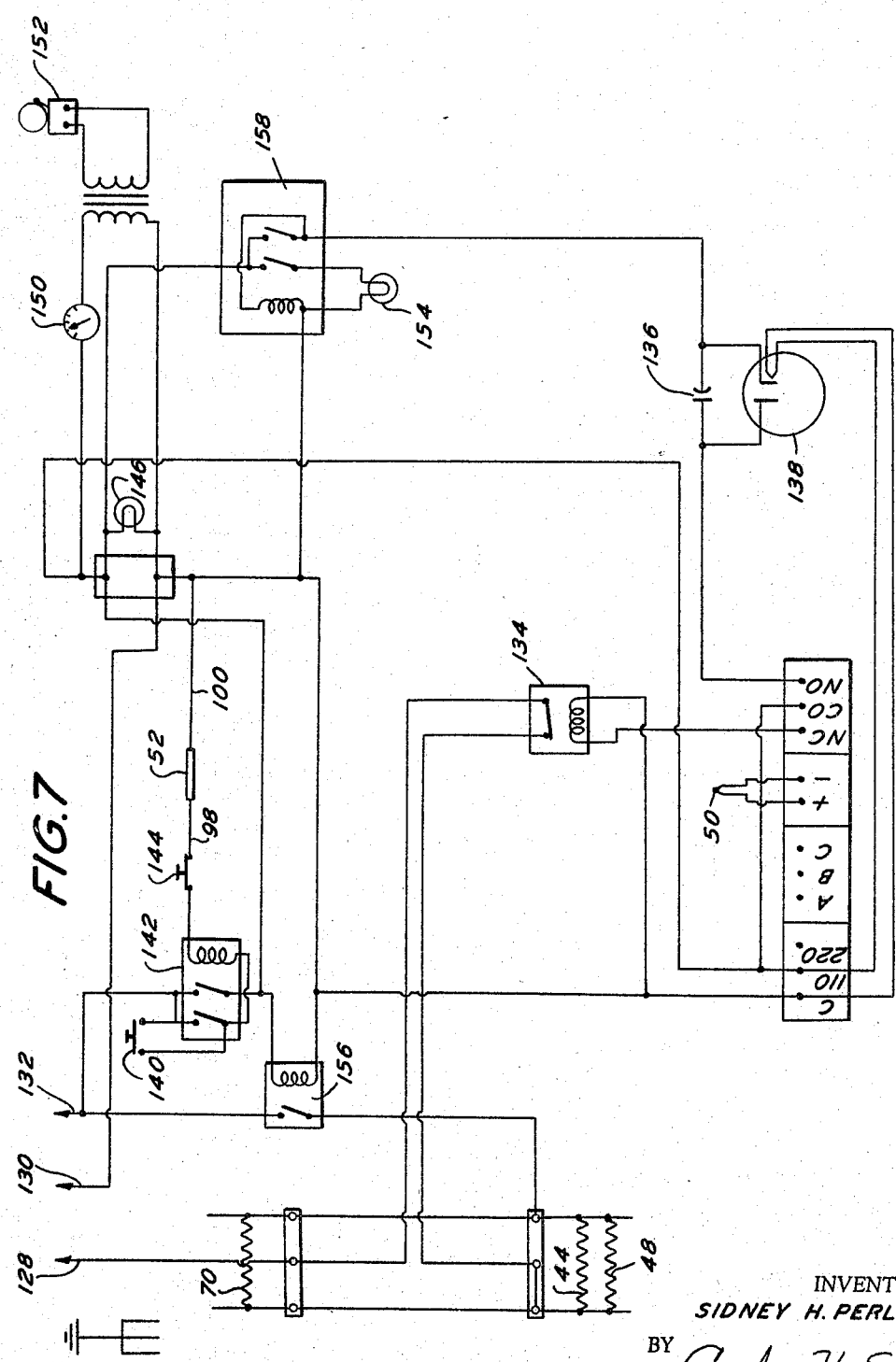

United States Patent Office 3,265,861
Patented August 9, 1966

3,265,861
FOOD HEATING OVEN
Sidney H. Perlman, Riverton, N.J., assignor to Temperature Engineering Corporation, Riverton, N.J., a corporation of New Jersey
Filed Aug. 12, 1963, Ser. No. 301,309
5 Claims. (Cl. 219—399)

This invention relates to a food heating oven, and more particularly to an oven adapted to receive a substantial number of frozen food packages and rapidly heat the same so that they may be served for consumption.

The oven of the present invention has been designed primarily for use in commercial establishments such as cafeterias wherein it is necessary to heat a substantial number of containers of frozen foods in a very short period of time. For example, the present invention is capable of heating approximately fifteen to twenty containers of frozen foods and presenting the same for consumption within a period of approximately five minutes. In this regard, it is to be noted that most frozen food containers commercially available are provided with directions indicating that the same should remain in the oven for a period of approximately thirty to forty-five minutes. It would be impractical for a commercial establishment such as a cafeteria to use thirty to forty-five minutes to heat containers of frozen foods. Yet, commercial establishments such as cafeterias have found it desirable to utilize pre-packaged frozen food portions since the same eliminate the large amount of waste wherein large batches of food are pre-cooked and only partially consumed. Further, the use of pre-packaged frozen foods insures that each customer will receive the same amount and eliminates the necessity for cleaning pots and pans and for employees to portion the food when it is disposed in a large pot or pan.

In accordance with the present invention, the oven includes a first outer housing and a second inner housing with insulation therebetween. The second housing is in the nature of a shell which may be readily removed for maintenance purposes. If desired, the shell may be provided with a shelf thereby dividing the second housing into upper and lower chambers. The shell and shelf are provided with walls sufficiently thick and made from a material of high conductivity so that said second housing will absorb heat in the absence of food and give up its heat quickly in the presence of food.

The packages of frozen food to be heated in the oven of the present invention are subjected to heat by conduction from below thereby melting the ice crystals in the frozen food. Thereafter, the food is brought up to heated temperature by infrared rays. Unless the ice crystals in the food are first melted, the infrared rays are of no value since they bounce off of ice crystals. In order to melt the ice crystals as soon as possible, I have found that the walls of the second housing and the shelf, if any, should be made from a material which will absorb a large amount of heat in the nature of a heat sink but will rapidly dissipate its heat by conduction, thereby differing from a heat sink. In this regard, I have found that this desirable objective may be accomplished by making the second housing from aluminum having a thickness of approximately one-half inch.

The oven of the present invention is preferably provided with a manually operable timer having an audible signal capable of indicating that the food is ready for serving. The oven is provided with a temperature sensing means associated with the heaters for maintaining the temperature in said second housing within a specified range. Also, an overheat sensing device is provided to interrupt the current to the heaters when the heaters become overheated.

It is an object of the present invention to provide a novel food heating oven.

It is another object of the present invention to provide a food heating oven capable of rapidly heating frozen food by conduction and infrared rays.

It is still another object of the present invention to provide a heating oven which is particularly adaptable for heating containers of frozen food so that they may be served within a period of approximately five minutes.

It is a still further object of the present invention to provide a commercial food heating oven which enables cafeterias and the like to heat individual portions of frozen food in a short time.

It is another object of the present invention to provide a novel food heating oven wherein the chamber in which the food is to be heated is defined by a housing having walls sufficiently thick and made from a material of high conductivity so that said walls will absorb heat in the absence of food and give up heat quickly in contact with food or its container.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is a perspective view of the oven of the present invention.

FIGURE 2 is a sectional view taken along lines 2—2 in FIGURE 1.

FIGURE 3 is a sectional view taken along lines 3—3 in FIGURE 2.

FIGURE 7 is a schematic wiring diagram for the electrical components of the oven illustrated in FIGURES 1–6.

Referring to the drawings in detail, wherein like numerals indicate like elements, there is shown in FIGURE 1 an oven designated generally as 10.

Figure 4:
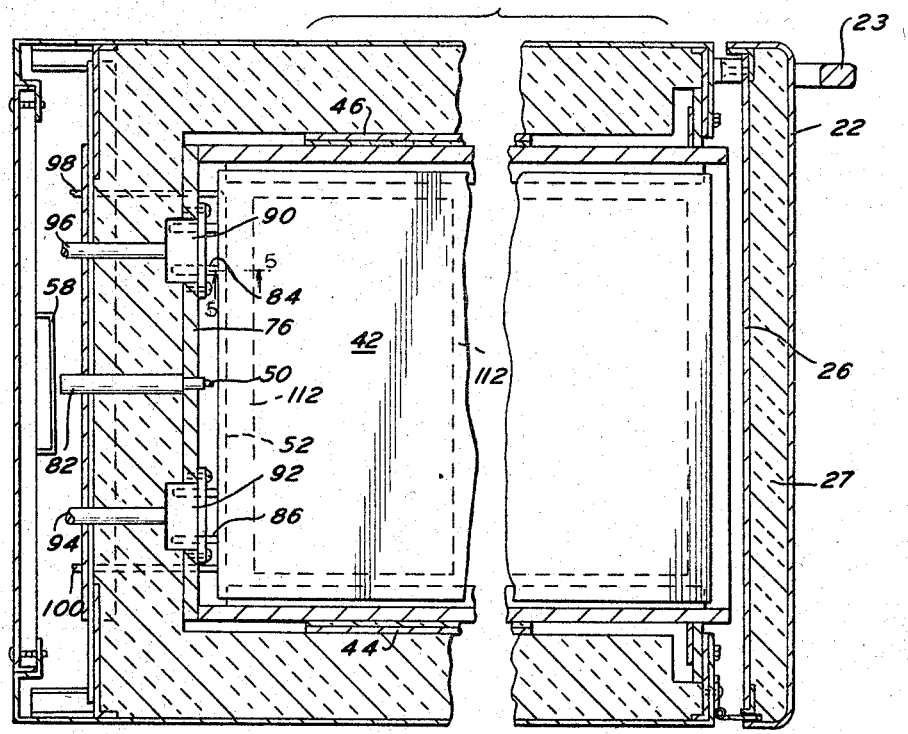
FIGURE 4 is a sectional view taken along lines 4—4 in FIGURE 3.
Figure 5:
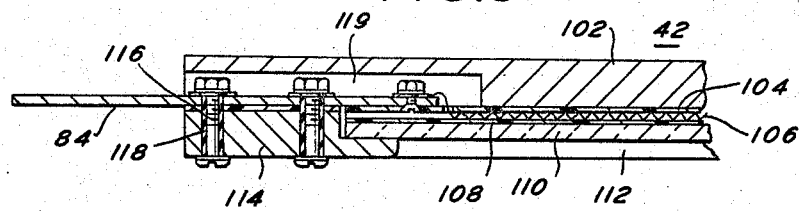
FIGURE 5 is a sectional view taken along lines 5—5 in FIGURE 4.

The oven 10 includes a generally rectangular housing which may be made from a material requiring little maintenance and having a presentable appearance, such as stainless steel. The housing includes a top wall 12, side walls 14 and 18, a bottom wall 16, and a rear wall 20. The housing is provided with a pivotably mounted door 22 having a handle 23. An instrument panel 24 is provided below the door 22. The inner layer 26 of the door 22 is provided with a magnetizable member adapted to cooperate with the magnetic member 25 to retain the door 22 in a closed disposition.

The door 22 is provided with insulation 27 between its inner and outer layers. A second housing in the nature of a shell 29 is disposed within the first mentioned housing with a blanket of insulation 28 therebetween. The insulation 28 may be of the commercially available asbestos-type sold under the trademark "E-Felt." The insulation 28 thermally and electrically isolates the shell 29 from the outer housing of the oven 10.

The shell 29 is provided with walls sufficiently thick and made from a material of high conductivity so that it will absorb heat in the absence of food and give up its heat quickly in the presence of food. I have found that this may be accomplished by making the walls from aluminum having a thickness of approximately one-half inch. Thus, "high conductivity," as used herein, means thermal conductivity approximating or greater than that of aluminum or high aluminum alloys. The shell 29, as illustrated, is constructed from two U-shaped halves, with each half having side walls 30 and 32 and a bottom wall 34. The two halves are juxtaposed together and metallurgically joined with inwardly directed flanges 38 and 40 provided therebetween. The top wall of the shell 29 is modified so as to provide an infrared heating means 36.

A shelf 42 may be supported by the flanges 38 and 40. Longitudinally extending heaters 44 and 46 are provided on the side walls of the shell 29 with a layer of mica 45 between the heaters and the shell. A plurality of heater units 48 are provided at spaced points along the bottom wall 34 as shown more clearly in FIGURE 3. Each of the heater units 48 includes a heater 62 spaced from the bottom wall 34 by a thin sheet of mica 64. The sheets of mica 45 and 64 may have a thickness of approximately .020 inch.

As shown more clearly in FIGURES 2–4, a thermocouple 50 is provided within the heating chamber of the shell 29. The thermocouple 50 is designed to immediately cause the temperature within the shell 29 to be raised when the operating temperature falls below a specified range. The drop in the temperature within the shell 29 will be the result of placement of frozen food within the shell 29. Thermocouples are commercially available which enable the operating range to be as low as two to four degrees. The manner in which the thermocouple 50 controls the heaters will be described in greater detail hereinafter in connection with the discussion of the electrical circuit illustrated diagrammatically in FIGURE 7. An overheat thermostat 52 is provided within the shell 29 to shut off the oven automatically when the temperature therewithin gets too high as will be described in greater detail hereinafter.

The outer housing includes a chamber 54 to the rear of the instrument panel 24 and below the interface wall 56 as shown more clearly in FIGURES 2 and 4. An electrical junction box 58 is provided on the rear wall 20 of the outer housing. A plurality of brackets 60 are provided along one wall of the outer housing within chamber 54 to support the various instruments such as meters, timers, bells, etc., which are to be operated by or illustrated on the instrument panel 24. The various instruments will be described in greater detail hereinafter.

Figure 6:
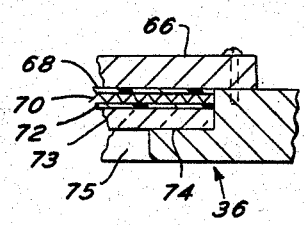
FIGURE 6 is an enlarged detailed view within the circle 6 of FIGURE 3.

As shown more clearly in FIGURES 3 and 6, the top wall of the shell 29 is provided with infrared heating means 36. The top wall of the shell 29 is provided with a plurality of apertures 75 with each aperture surrounded by a shoulder 74. A separate quartz filter 73 overlies the aperture 75 and is supported by the adjacent shoulder 74. An electrical heater 70 sandwiched between thin layers of mica 68 and 72 overlie the quartz filter 73. A top cover plate 66 is bolted or otherwise secured to the top wall of the shell 29 to retain the heaters and quartz filters in assembled disposition. The quartz filters are highly emissive and they therefore dissipate heat rapidly.

The shell 29 is open at the front end and provided with a rear wall 76 at the opposite end. It will be noted that the front end of the shell 29 is spaced from the layer 26 on the door 22 as shown more clearly in FIGURES 3 and 4. This space allows for expansion of the shell 29 when the same is heated. The rear end of the shell 29 is supported from the interface wall 56 by a support member 78. The support member 78 is thermally and electrically isolated from the interface wall 56 by a layer of insulation material such as mica 79.

The outer housing is provided with a rear chamber 81 in open communication with the chamber 54. As shown more clearly in FIGURE 3, a conduit 80 has one end in communication with chamber 81 and another end in communication with the interior of shell 29. The end of conduit 80 which communicates with chamber 81 is provided with external threads so that it may be coupled to an exhaust conduit for conveying fumes or the like away from the oven 10. If desired, a catalyst burner may be coupled to the conduit 80. Otherwise, a closure cap will be threaded onto the conduit 80.

A pipe 82 has one end in communication with chamber 81. The other end of pipe 82 communicates with the interior of shell 29 as shown more clearly in FIGURE 3. The pipe 82 facilitates the housing of the electrical leads for the thermocouple 50.

When a shelf 42 is provided, the same is preferably provided with two sets of jack connectors 84 and 86 adapted to cooperate with receptacles 90 and 92, respectively. Current is coupled to the receptacles 90 and 92 by electrical conduits 96 and 94 respectively. Current is coupled to the thermostat 52 by electrical conduits 98 and 100.

It will be noted that the provision of the jack connectors 84 and 86 for the shelf 42 enable the same to be readily removed when desired. Often, it is necessary to remove the shelf 42 when heating containers which are tall. The shelf 42 includes upper and lower halves 102 and 114 respectively, coupled together by screws (not shown). The lower half 114 is provided with a plurality of apertures 112. A separate quartz filter 110 overlies each of the apertures 112 and is supported by a shoulder therearound. An electrical heater coil 106 sandwiched between thin layers of mica 104 and 108 overlies each of the quartz filters.

The jack connectors 84 and 86 are coupled to the lower half 114 by a plurality of bolts 116. The bolts 116 are thermally and electrically isolated from the jack connectors and the lower half 114 by washers and sleeves 118. The upper half 102 is appropriately provided with a channel 119 to receive nuts for the bolts 116. The heater coil 106 is electrically coupled to the jack connectors within the channel 119.

It will be noted that the length of the shelf 42 is less than the length of the shell 29. When a shelf is utilized, the space thereabove is in open thermal communication with the space therebelow. The longitudinally extending side edges of the shelf 42 are spaced from the side walls 30 and 32 of the shell 29 so as to allow for thermal expansion.

The front wall 120 of the outer housing is provided with an opening 122. The front end of the shell 29 extends through the opening 122 as shown more clearly in FIGURE 3. The front end of the shell 29 is provided with an outwardly extending flange 124 which is bolted to the front wall 120 with a layer of insulation disposed therebetween. Hence, the shell 29 may be readily removed by removing screws which secure the front wall 120 to the remainder of the outer housing. After loosening the screws securing the sockets 90 and 92 to the rear wall 76 of the shell 29, the shell 29 and front wall 120 of the housing may be removed by opening the door 22 and sliding the same forwardly. Before removing the shell 29, the electrical connections for the thermocouple 50 and the thermostat 52 will be disconnected. If for any reason the shell 29 is defective or the heaters are not properly maintaining the desired temperature, the entire shell and heater may be readily removed and a new one substituted therefor with minimum effort.

The operation of the oven of the present invention can best be shown with reference to FIGURE 7 in which the electrical circuit therefor is shown. In FIGURE 7, there is shown the heaters 44, 48 and 70 connected in parallel circuit relation to a source of alternating current through conductors 128 and 132. A starting switch 140 is provided to initiate the operation of the oven. When the starting switch 140 is closed, it completes the circuit between terminals 130 and 132 of an alternating current supply to energize relays 142 and 156 closing their contacts. The stop push button 144 and thermostat 52 are both in the closed circuit position.

Energization of relay 156 closes its contacts so that the heaters 70, 44, 48, etc., can be energized from the alternating current source. A relay 134 is also provided which is normally closed and is operative from the thermocouple 50. The thermocouple 50 will energize relay 134 to open its contacts when the temperature in the oven exceeds a preset value which in a working embodiment of the present invention was 750° F. The contact board on which the thermocouple 50 is mounted has terminals A B C for metering various portions of the circuit.

A lamp 146 is provided across terminals 130 and 132 to indicate when the oven is on. A second lamp 154 is provided which is energized by relay 158 to indicate when thermocouple 50 exceeds the predetermined temperature and operates relay 134. A time delay relay system including a diode 138 in parallel with a capacitor 136 is provided to prevent chattering of relays 134 and 158. The relay 134 through thermocouple 50 is operative to maintain the temperature in the oven at the predetermined setting. The thermostat 52 is operative only if the temperature in the oven exceeds a maximum safe temperature usually set considerably higher than the setting of thermocouple 50. In the actual embodiment discussed previously, the setting of thermostat 5 was 1000° F.

A timer mechanism 150 is provided for energizing an alarm 152 after the food has cooked for a predetermined amount of time. The timer 150 can be set for any given time by the operator of the oven in accordance with the food being cooked. When the alarm 152 sounds, the operator can operate stop button 144 which will de-energize the electrical control system.

When a tray of containers of frozen food is placed within the shell 29 on the bottom wall 34 thereof, the bottom wall 34 will melt the ice in the container of the frozen food by conduction. Due to the high conductivity of the material from which the shell 29 is made, the melting of the ice will be accomplished very rapidly, such as a period of three minutes. Thereafter, the infrared rays from either the shelf 42 if the same is present, or from the means 36 will heat the food up to serving temperature. If the containers for the frozen food are sufficiently short, and the shelf 42 is utilized, a tray of containers of frozen food may be supported on the bottom wall 34 and on the shelf 42. Each of the trays of containers of frozen food will be subjected to heat by conduction from a highly conductive wall and to infrared rays from above.

The present invention may be embodied in other specific forms without departing from the spirit or essential attributes therof, and, accordingly, reference should be made to the appended claims, rather than to the foregoing specification as indicating the scope of the invention.

I claim:

1. A food heating oven comprising a first housing, a second housing within said first housing, insulation between said housings, said second housing having walls sufficiently thick and made from a material having high conductivity so that said second housing will absorb heat and give up its heat quickly in the presence of food within said second housing, a shelf horizontally disposed within said second housing, said shelf having an upper layer sufficiently thick and made from a material of high conductivity so that said upper layer will give off its heat by conduction quickly in the presence of food supported thereon, infra-red heating means on said shelf below said upper layer thereof, jack connectors on one end of said shelf, receptacles supported by said second housing, said shelf being removably supported within said second housing, the dimensions of said shelf being sufficiently smaller than the dimensions of said second housing so that the space above said shelf will be in thermal communication with the space below said shelf, means supporting said second housing within said first housing in a manner so that said second housing may be readily removed from its disposition within said first housing, said second housing comprising a tubular shell, electric heaters on and supported by walls of said second housing, some of said electrical heaters supported by said housing being on the outside thereof and along side walls as well as the bottom wall of said second housing, electrical means in a top wall of said second housing for cooking food by infra-red rays, temperature sensing means associated with said heaters for maintaining the temperatures in said second housing within a specified range, means for providing access into said second housing, and the walls and the top wall of said second housing having a thickness of approximately one-half inch and having a thermal conductivity approximating or greater than that of aluminum or high aluminum alloy.

2. A food heating oven comprising a first housing, a second housing within said first housing, insulation between said housings, said second housing having walls sufficiently thick and made from a material having high conductivity so that said second housing will absorb heat and give up its heat quickly in the presence of food within said second housing, a shelf horizontally disposed within said second housing, said shelf having an upper layer sufficiently thick and made from a material of high conductivity so that said upper layer will give off its heat by conduction quickly in the presence of food supported thereon, infra-red heating means on said shelf below said upper layer thereof, the dimensions of such shelf being sufficiently smaller than the dimensions of said second housing so that the space above said shelf will be in thermal communication with the space below said shelf, means supporting said second housing within said first housing in a manner so that said second housing may be readily removed from its disposition within said first housing, said second housing comprising a tubular shell, electrical heaters on and supported by walls of said second housing, some of said electrical heaters supported by said housing being on the outside thereof, electrical means in a top wall of said second housing for cooking food by infra-red rays, means providing access into said second housing, and the walls and the top wall of said second housing having a thickness of approximately one-half inch and having a thermal conductivity approximating or greater than that of aluminum or high aluminum alloy.

3. A food heating oven in accordance with claim 2 wherein said shelf is removably supported within said housing.

4. A food heating oven in accordance with claim 2 wherein at least some of said electrical heaters are supported by a bottom wall of said housing.

5. A food heating oven in accordance with claim 2, and temperature sensing means associated with said heaters for maintaining the temperature in said second housing within a specified range.

References Cited by the Examiner

UNITED STATES PATENTS

| | | | |
|---|---|---|---|
| 1,183,926 | 5/1916 | Waters | 219—540 X |
| 1,208,637 | 12/1916 | Phelps | 219—403 X |
| 1,234,991 | 7/1917 | Winterbotham | 219—396 X |
| 1,565,499 | 12/1925 | Reid | 219—510 X |
| 1,667,595 | 4/1928 | Halle | 219—413 |
| 1,760,064 | 5/1930 | Hynes | 219—514 X |
| 2,151,319 | 3/1939 | Finch | 219—514 X |
| 2,994,760 | 8/1961 | Pecoraro et al. | 219—413 X |
| 3,059,087 | 10/1962 | Perlman | 219—411 X |

ANTHONY BARTIS, *Acting Primary Examiner.*

RICHARD M. WOOD, *Examiner.*

R. F. STAUBLY, *Assistant Examiner.*